May 12, 1931. C. L. STOKES 1,804,446
MEANS FOR APPLYING ENGINE EXPLOSION PRESSURE
Filed Aug. 2, 1924   3 Sheets-Sheet 1
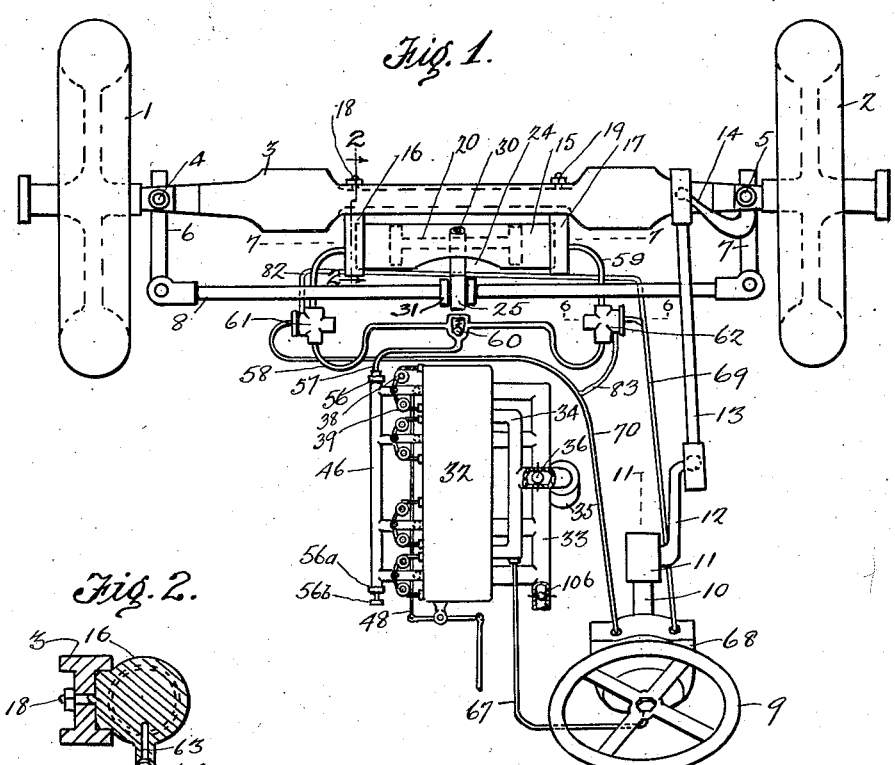
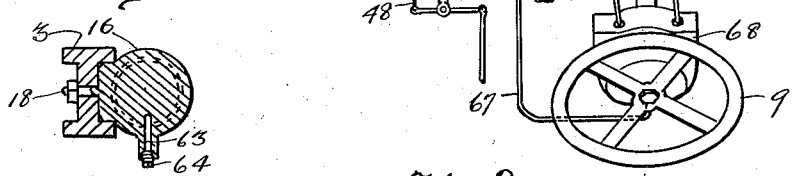
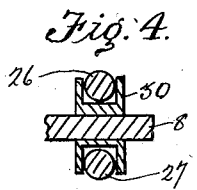
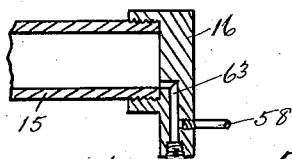
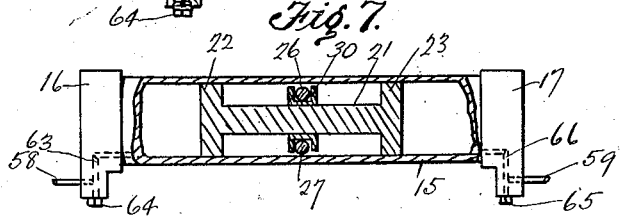
INVENTOR.
Charles L. Stokes May 12, 1931. C. L. STOKES 1,804,446
MEANS FOR APPLYING ENGINE EXPLOSION PRESSURE
Filed Aug. 2, 1924 3 Sheets-Sheet 2
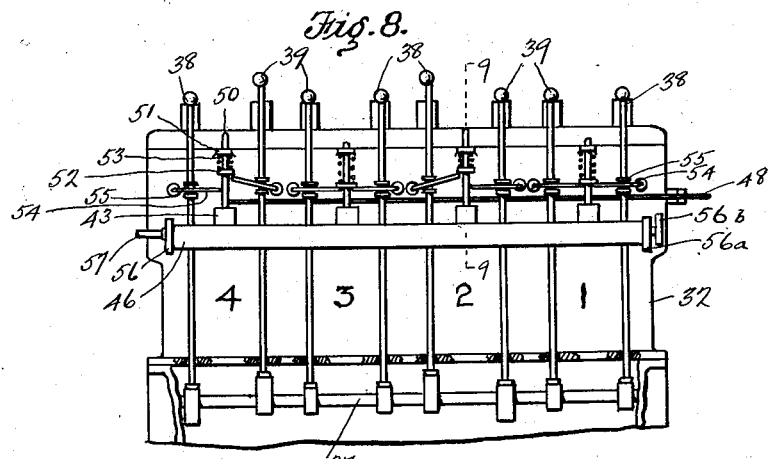
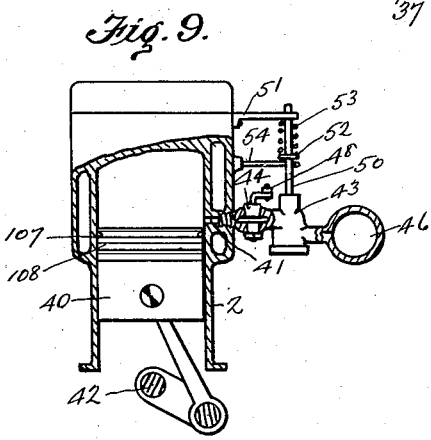
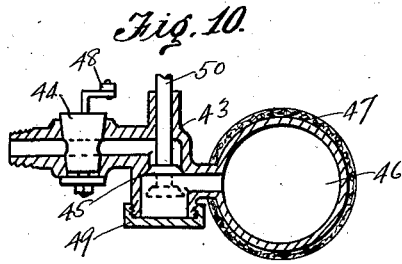
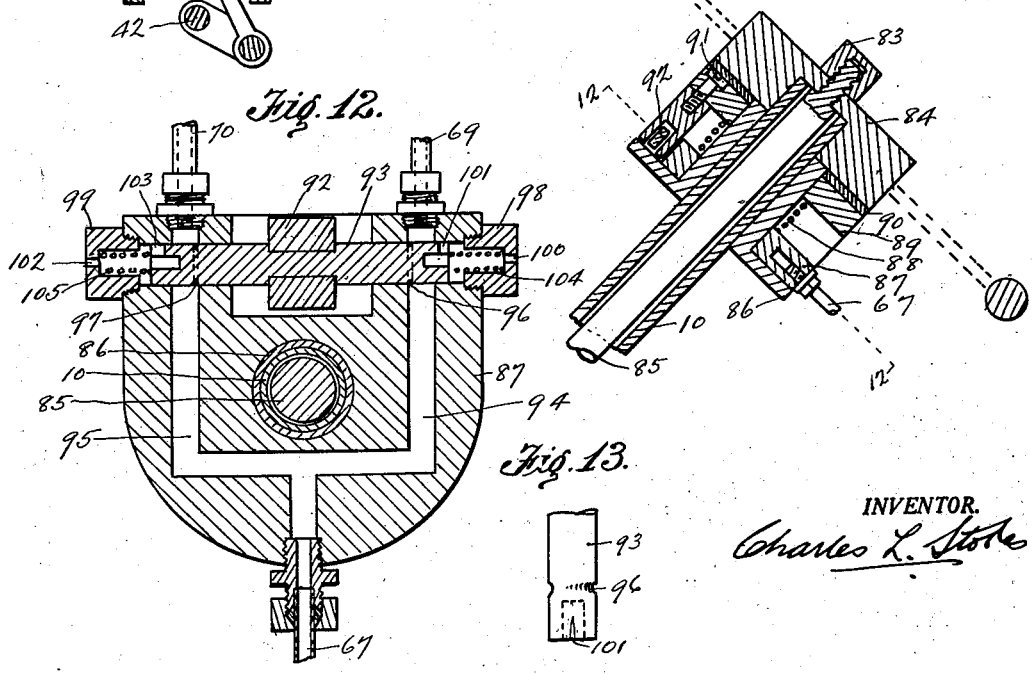
INVENTOR.
Charles L. Stokes

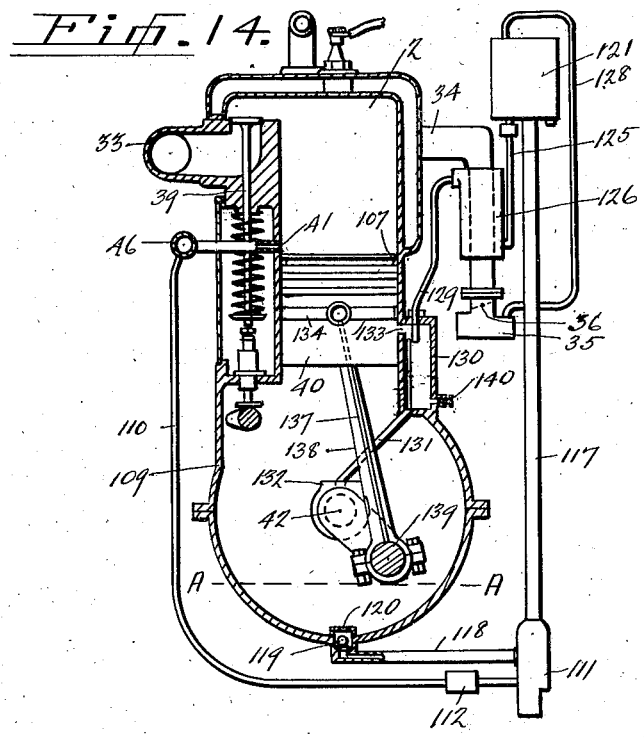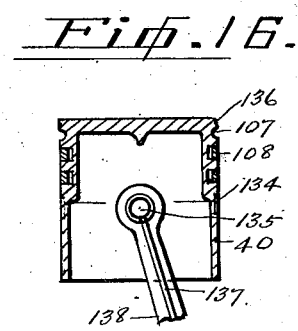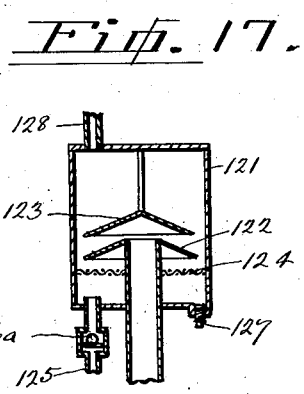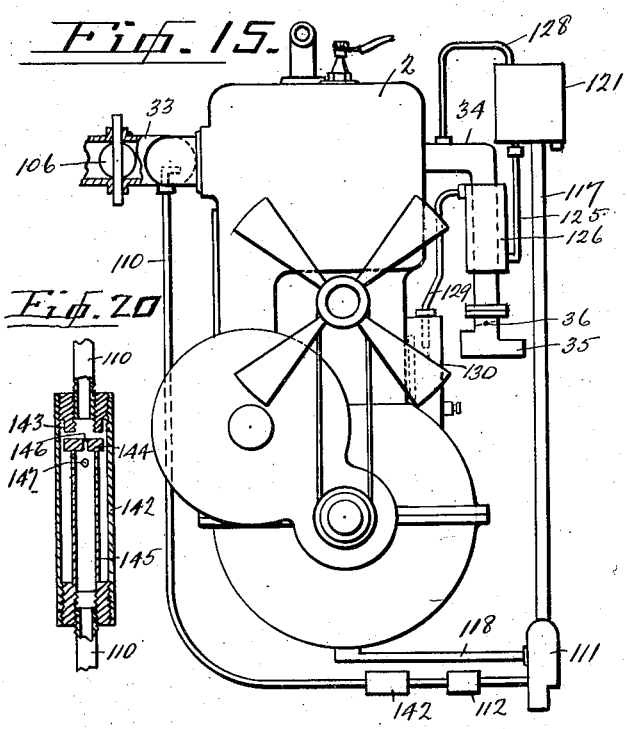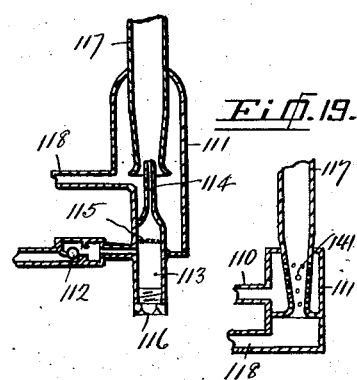

Patented May 12, 1931

1,804,446

UNITED STATES PATENT OFFICE

CHARLES LAWRENCE STOKES, OF LOS ANGELES, CALIFORNIA

MEANS FOR APPLYING ENGINE EXPLOSION PRESSURE

Application filed August 2, 1924. Serial No. 729,849.

My invention relates to improvements in mechanisms designed to be operated directly by the gaseous fluid pressure derived from an internal combustion engine.

The principal object of my invention is to utilize the explosion pressure of an internal combustion engine.

Another object of my invention is to utilize the vacuum induced by an internal combustion engine.

Other objects will become apparent as my invention is more fully disclosed, inasmuch as several embodiments of my invention are illustrated and described.

Referring to the drawing in which the same numbers indicate like parts:—

Fig. 1 is a view showing a preferred embodiment of my invention applied to the steering apparatus of an automobile.

Fig. 2 is a vertical section along the lines 2—2 of Fig. 1.

Fig. 3 is a longitudinal section of the yoke arm and associated parts.

Fig. 4 is a sectional view along the lines 4—4 of Fig. 3.

Fig. 5 is a horizontal section of one end of the cylinder.

Fig. 6 is a sectional view along the lines 6—6 of Fig. 1.

Fig. 7 is a longitudinal sectional view along the lines 7—7 of Fig. 1.

Fig. 8 is a side elevation of the motor with parts broken away and parts in section.

Fig. 9 is a view, partly in section, along the lines 9—9 of Fig. 8.

Fig. 10 is a transverse section of the gas reservoir and associated valves.

Fig. 11 is a sectional view along the lines 11—11 of Fig. 1.

Fig. 12 is a transverse sectional view along the lines 12—12 of Fig. 11.

Fig. 13 is an elevational view of one end of the control piston showing the V-shaped notch therein.

Fig. 14 is a vertical sectional view of another embodiment of my invention.

Fig. 15 is a view in elevation showing a modification of the apparatus in Fig. 14.

Fig. 16 is a sectional detail of Fig. 14.

Fig. 17 is a sectional detail of part of Fig. 14 and Fig. 15.

Fig. 18 is a sectional detail of part of Fig. 14 and Fig. 15.

Fig. 19 is an alternative of Fig. 18.

Fig. 20 is a detail of part of Fig. 15.

Referring to Figs. 1 to 13 inclusive, a specific application of my invention is shown which comprises improvements on the application of Charles L. Stokes and Charles F. Lienesch for a pneumatic steering mechanism, S. N. 714,602, filed May 20th, 1924, which application is now co-pending.

In the aforesaid co-pending application, there was described and claimed a means of utilizing the engine induction vacuum, or the engine compression pressure, for the operation of pneumatic steering mechanism adapted to assist the manual steering mechanism usually provided for an automotive vehicle. I have now discovered improved ways of applying the engine induction vacuum and at the same time utilizing the engine explosion pressure whereby not only may the steering of the vehicle be greatly improved, but also the application of the engine vacuum and explosion pressure may be utilized at the same time for many other purposes, as will be further described.

In an automobile, it is customary to pivot the front wheels 1 and 2 on the front axle 3 by the king pins 4 and 5 respectively. Steering knuckles 6 and 7 are also respectively pivoted on 4 and 5 for moving the spindles on which 1 and 2 are mounted and pivoted at 4 and 5. 6 and 7 are pivotally joined by a tie rod 8 and 8 is adapted to be moved in either direction for turning the wheels 1 and 2 by means of a manually operated steering wheel 9 which works through a steering column 10 and a reducing gear box 11 for actuating a steering arm 12, a drag link 13 and a second steering arm 14 rigidly connected to 7. Inasmuch as many forms of manual steering linkages are well known, a short description of the same is given solely for the sake of brevity, inasmuch as my invention is applicable for assisting in the operation of all manually operated forms of all such well known steering mechanisms.

This assistance is applied to reduce the torque necessary to turn the steering wheel 9, so that the wheel 9 may be turned a relatively short distance when it is desired to turn the wheels 1 and 2 in as short a turn as possible and I have accomplished this by means of a cylinder 15 having end caps 16 and 17 firmly fastened to the axle 3 by bolts 18 and 19 respectively. The caps 16 and 17 are threaded to the ends of 15 and within 15 is floating a piston 20 comprising a connecting rod 21 and piston heads 22 and 23. The rear end of 15 is cut-away at 24 a certain distance to permit of the longitudinal movement of a split yoke arm 25 comprising an upper half 26 and a lower half 27 suitably clamped about the central portion of 21 midway of 22 and 23 by means of the bolts 28 and 29, and a hole is suitably placed in the front end of 25 for fastening the bolt 28.

The rear ends of 26 and 27 encircle a spool 30 clamped, or welded, tightly on 8 to the end that the longitudinal movement of 20 will cause a corresponding longitudinal movement of 8.

Space is allowed in order to provide for angular movement of 8 toward 3 when wheels 1 and 2 are being turned.

The internal combustion engine which drives the automobile is somewhat diagrammatically illustrated at 32, parts of which include an exhaust pipe 33, an inlet manifold 34, a carburetor 35 and a throttle 36 controlling the passage of liquid fuel and air from 35 into 32 through 34. The engine 32 is illustrative of a typical four cylinder four cycle, gasoline engine having cylinders numbered 1, 2, 3 and 4 and having inlet and exhaust valves for each cylinder actuated from the usual cam shaft 37 by means of a push rod 38 for each exhaust valve and a push rod 39 for each inlet valve. If now it be assumed, referring to Figs. 8, 9 and 10 specifically, that the firing order of the cylinders of engine 32 is 1, 3, 4 and 2, and if it be assumed that the piston in cylinder 1 is at upper dead center and about to fire, in the average course of engine timing it will then be observed that the inlet valve on cylinder 4 is just opening and the exhaust valve on cylinder 2 would be opened, and of course the inlet and exhaust valves of all the cylinders operate in cyclic order therein.

I am able to utilize this knowledge for the abstraction of a certain amount of gas under pressure from the cylinders for the purpose of my invention. If it be assumed that the piston 40 in cylinder 2 is at about 120° of travel from upper dead center on its explosion stroke, it is well known that there exists a certain degree of pressure in the cylinder 2 at this time depending upon the position of throttle 36 and I arrange to draw off from each cylinder a certain quantity of gas under pressure at about 120° of piston travel in each cylinder on each explosion stroke thereof and inasmuch as the cyclic operation in each cylinder is similar, the description of performing this abstraction of gas under pressure automatically when applied in connection with Fig. 9 will apply equally to all cylinders in an internal combustion engine, and it should be here noted that my principle is not only applicable to four cycle engines, but is equally applicable to two cycle engines.

In each of the cylinders 1, 2, 3 and 4 is arranged a port 41, adapted to be uncovered by a piston 40 at a predetermined degree of rotation of the crank shaft 42 and collectively joined to ports 41 are fittings 43 comprising manually operated valves 44 and automatically operated valves 45, and valves 44 and 45 control the passage of gases through 41 and 43 to a reservoir 46. 46 may be suitably insulated against loss of heat by an asbestos jacket 47 or the same object will be attained if 46 is jacketed by the exhaust gases passing through 33. Valves 44 are collectively linked to a control rod 48, in order that the amount of gas under pressure passing through 41 to 46 may be manually controlled and adjusted. Valves 45 are inserted to their seats in 43 through detachable caps 49 and valves 45 terminate in valve stems 50 adapted to be vertically guided through bars 51 attached to the exterior of 32. Rings 52 are firmly fastened on 50 for retaining springs 53 whereby 45 may be maintained in a predetermined position. Valves 45 are seated and unseated by the action of rocker-arms 54 swiveled in sockets on the cylinders and adapted to be moved by spools 55 attached to each of the valve push rods 38 and 39, and the ends of 54 are adapted to be guided by the spools 55, their ends normally resting on the lower side of the rings 52. Valve push rods 38 and 39 may be the stems of the exhaust and inlet valves, particularly in the case of an L head engine.

With this construction in mind, it will be easy to follow the cyclic operation of each and every cylinder operating as a four cycle engine when it is stated that the valve 45 is arranged to be normally seated during the periods in which both the inlet and exhaust valves are open and this fact will be more readily apparent when it is explained that the exhaust valve normally opens at about 145° past upper dead center. Referring particularly to cylinder 2, the port 41 is arranged to be uncovered at 120° of stroke by piston 40 and therefore, inasmuch as the inlet valve would be closed during the explosion stroke, there would exist a clear passage from the interior of 2 through 41 and 43 to the interior of 46. Gases under pressure would therefore pass there-through until 145° of revolution had been reached when the exhaust valve would start to open. At this time the movement of valve push rod 38 would carry the rocker-arm 54 connected therewith in an upward direction thus raising valve 45 to its seat and cutting off further passage of exhaust gas in either direction from the interiors of 2 and 46.

The exhaust valve will remain open until practically upper dead center is again reached and therefore, not only does the valve 45 remain closed but also the port 41 will be again covered by the piston 40 thus providing a double seat against the loss of gases under pressure from 46. The exhaust valve is fully closed at a few degrees past upper dead center and therefore the valve 45 becomes unseated but, as already explained the loss of gas under pressure at 46 is prevented because the port 41 is now covered by piston 40. The inlet valve now opens a few degrees past upper dead center after the exhaust valve has closed and the suction stroke of the piston 40 becomes effected for drawing in air and fuel from 35, through 34 and, depending upon the position of 36, a greater or less vacuum is maintained in 34 and the cylinder 2.

The opening of the inlet valve thus closes the valve 45, the same action being observed as already described for the closing of 45 in connection with the opening of the exhaust valve 39, and therefore when the piston 40 reaches 120° of revolution past upper dead center on its suction stroke, the port 41 will again be uncovered, but there will be no escape of gases under pressure from 46 because the valve 45 will be seated.

The piston 40 now continuing its movement, reaches bottom dead center and starts upward on its compression stroke, whereupon the inlet valve 39 will close at about 20° past bottom dead center, the closing of inlet valve 39 at the same time causing the valve 45 to become unseated thus permitting the exit of hot gases under pressure from 46 to the interior of 2 until piston 40 shall have again covered the port 41 on its compression stroke.

In this manner it will be clearly seen that the admission of hot gases under pressure to the cylinder on the compression stroke of the piston after a full charge has been induced therein and the inlet valve closed, constitutes a method of charging the engine cylinder whereby greatly increased efficiency results because the volumetric efficiency of the induced charge is in no way impaired by the supercharging. The piston 2 completes its compression stroke, and the cycle of operation already described is again completed.

The amount of charging may be governed by the adjustment of valves 44 by means of the rod 48 which may be either manually controlled directly, or may be connected with throttle 36 to fully open 44 when 36 is closed, or vice versa, whereby a greater or less opening of 44 can be automatically maintained.

It should be especially noted that the supercharging by hot exhaust gases as described, is accomplished with stratification so that there is practically no contamination of the combustible mixture but the hot charging gases are introduced close to head of the piston where they will remain as a mass substantially separate from the combustible charge and it should also be especially noted that while the port 41 is placed at 120° of revolution, the position of the same may be varied in different engine designs to attain the best result.

There may be considerably more gases under pressure entrapped in the reservoir 46, which is conveniently in a form of a pipe manifold attached to all the cylinders, than will be used for charging and this excess of gas under pressure I now convey through a cap 56 on one end thereof to a pipe 57 for the operation of the piston 20. The pipe 57 is joined to pipes 58 and 59, which pipes 58 and 59 are of equal length, 58 being joined to the interior of 15 at one end through the cap 16 and 59 being joined to one end of 15 through the cap 17 and the passage of gases from 46 through 57 to 58 and 59 is controlled by a spring pressed check valve 60. A cap 56a closes the other end of 46 and a pressure regulator 56b may be attached thereto for maintaining a predetermined maximum pressure in 46. Caps 56 and 56a thus are readily removable for cleaning 46.

The pipe 58 has a pressure controlled valve 61 therein intermediate of its ends and the pipe 59 has a pressure controlled valve 62 placed therein intermediate of its ends. The pipes 58 and 59 are similarly joined to the caps 16 and 17 respectively and therefore a description of one is illustrative of both. The pipe 58 leads into a passage 63 drilled in 16 at about the lower level of 15 and 63 has a drainage space adapted to be drained by the removal of a plug 64 to the end that any accumulation of liquid in the cylinder 15 may be easily collected in 63 and removed by gravity or pressure. A plug 65 likewise serves to drain a passage 66 in 17.

A pipe 67 is led from the inlet manifold 34 on the engine side of throttle 36, to a control 68 mounted on the steering column 10, in order that the engine vacuum may be applied from 68 through a pipe 69 to the valve 62 and also through a pipe 70 to the valve 61. Both valves 61 and 62 are of similar construction and perform similar functions, therefore a description of valve 61, as illustrated in Fig. 6, will be sufficient for both valves. The valve comprises a casing 61 containing a differential piston 71 adapted to permit the application of exhaust gas pressure from 46 and engine induction vacuum from 67 thorugh 70. A portion of 61 comprises a cap 72 through which the piston 71 is inserted and held in a predetermined position by a spring 73. The pipe 70 for applying vacuum is fixed in the cap 72 and said vacuum is applied to the enlarged end of 71. The small end of 71 is adapted to receive pressure from pipe 58 through passage 74 and 71 contains a central passage 75 terminating at one end in a port 76 adapted to register with atmosphere through a port 77, a groove 78 adapted to permit passage of gas under pressure through 58 to 15, a port 79 adapted to register with a port 80, and a port 81 adapted at predetermined periods to apply vacuum through 58, to 15. One side of the enlarged portion of 71 is connected by a pipe 82 to the pipe 69 and a pipe 83, similarly placed with respect to the valve 62, connects 62 to the pipe 70.

The control 68 is specifically illustrated in Figs. 11, 12 and 13, wherein 68 is attached to a steering wheel by first removing a lock-nut 83 and lifting off the steering wheel 9. The lock-nut 83 serves to clamp the steering wheel hub 84 to the steering rod 85 and such connection may be made in any well known manner, for instance by the use of a tapered shank (not shown), keys and other similar apparatus.

When the wheel 9 is removed, a shouldered sleeve 86 is slipped over 10 and firmly fastened thereto. A control disk 87 is then slipped over 86 and firmly fastened thereto in a predetermined position. A spring 88 is then passed over 86 in order to separate an actuating disk 89 from 87. A leather clutch washer 90 is then placed over 86 and the wheel 9 replaced and locked in position by the nut 83.

The actuating disk 89 comprises a plain piece of metal containing a screw 91, the head of which is seated flush with its upper surface and 91 is adapted to firmly hold a forked dowel pin 92, the fork of which fits snugly over the square portion of a control piston 93 adapted for reciprocation in 87, whereby the application of engine vacuum through 67 to 69 and 70 may be controlled. The fitting of the forked portion of 92 over 93 may permit of only such lost motion as is compatible with a predetermined angular movement of 84, or may permit a large amount of such lost motion as is described in the aforesaid co-pending application.

The pipe 67 leads into passages 94 and 95, respectively receiving the pipes 69 and 70 and the movement of 93 controls the application of engine suction to 69 and 70 by means of a groove 96 on one end of 93 and a groove 97 on the other end of 93 for respectively applying vacuum to the pipes 69 and 70. The piston 93 slides in a passage in 87, one end of which is closed by a nut 98 and the other end of which is closed by nut 99. An air passage 100 permits atmosphere to pass through 98 to a tapered slot 101 in 93 and a hole 102 permits the passage of atmosphere to a tapered slot 103 in the other end of 93. Plug 98 retains a spring 104 under compression against one end 93 and plug 99 contains a spring 105 under compression against the other end of 93, in order that the piston 93 may normally be balanced.

In the steering of automobiles, there is generally a good deal of lost motion in the steering mechanism between wheel 9 and wheels 1 and 2. The torque to be applied manually to 9 is generally made a minimum by a gear-train in 11, but in order to get maximum parallel angularity of 1 and 2, for instance a 60° turn, it is necessary to make a 360° turn of wheel 9, or more depending on the resistance offered. It is, therefore, an object of this invention to reduce the torque to be manually applied to 9, to eliminate the effect of lost motion between 9 and 1 and 2, to make the diameter of 15 a minimum, and to reduce the number of degrees through which 9 shall be turned for maximum effect.

The action of my apparatus is therefore enhanced by the utilization of engine explosion pressure in combination with engine induction vacuum, because the vacuum is highest when the explosion pressure is a minimum and the explosion pressure is a maximum when the vacuum is a minimum. In this manner my apparatus maintains its efficiency under every condition of engine operation and enables me to install compact apparatus for aiding the steering of an automobile.

Prior to turning, the wheels 1 and 2 are assumed to be normally in the position shown in Fig. 1, in which case there is no engine vacuum if it be assumed that the engine 32 is dead, the pistons 20 and 93 will be in a central position and the spring 73 will be expanded, thereby permitting the application of engine vacuum through 82, 80, 79, 81 and 58 to one end of the interior of 15 when engine 32 is started. In like manner engine vacuum may be applied to the other end of 15 through 83 and 62 because the starting of 32 will cause engine vacuum to be applied from 34 through 67 to 69 and 70 by way of the passages 94 and 95 and the grooves 96 and 97 respectively.

It will be noted that prior to the starting of 32, the groove 78 will not permit the passage of engine explosion pressure from 46 to each end of 15 through 58 and 59, but as soon as 32 starts the application of engine vacuum, as described, through 82 and 83 causes an equal reduction of pressure in each end of 15.

At the same time gases under pressure are accumulated in 46 and pass through 57 and 60 to 58 and 59 and are applied through 74 to the small end of differential piston 71 causing first the admission of atmosphere through 77, 76, 75 and 81 to the interior of each end of 15 equally. This initial movement of 71 in 61 and 62 closes off 79 from 80 so that no atmosphere is permitted to pass from 77 to the interior of 69 and 70. The increasing pressure in 46 causes further movement of 71 to the end that ports 76 and 81 are shrouded and the groove 78 permits the passage of exhaust gases equally through 58 and 59 to the interior of 15 at each end thereof.

If it now be assumed that wheels 1 and 2 are to be turned a small distance to the right, wheel 9 will also be turned a small distance to the right whereupon, due to the pressure of spring 88, the hub 84 will move the actuating disk 89 a small distance to the right thus causing the dowel pin 92 to first shroud the groove 97 on piston 93 thus cutting off engine vacuum from 70 thereafter admitting air through 103 to break the vacuum in 70. At the same time it will be noted that the engine vacuum is still being applied through 96 to 69.

This admission of atmosphere to 70 increases the pressure on the large end of differential piston 71 in 61 thereby reversing the action of piston 71 as above described, first shrouding the groove 78 and thereafter permitting the escape of gas under pressure through the ports 81, 76 and 77 to atmosphere. At the same time the other end of 15 will be filled with gases under pressure from 46 because the action of valve 62 has not changed, due to the continued application of engine vacuum through the groove 96, therefore the application of gaseous pressure to the piston head 23 will cause a predetermined pressure to be applied through 25 to 8 for forcing the same to the left.

The vacuum being applied through 69 in this movement is also being applied through 82 to one side of the larger end of differential piston 71 and inasmuch as atmospheric pressure only is now effective through 70, the vacuum being applied through 82 is effective, by the maximum movement of 71 to be applied through 80, 79, 81 and 58 to the piston head 22 for adding increased pull to the tie-rod 8 in assisting in the movement of wheels 1 and 2 and reducing the torque to be applied to 9.

If then it is desired to turn wheels 1 and 2 fully to the right, wheel 9 will be turned fully to the right whereupon the dowel pin 92 will come into contact with the shoulder of a recess in 87 wherein 93 slides and this causes the slippage of the hub 84 because of the friction leather clutch 90, or in other words, the movement of 92 is limited.

This full turning of 9 to the right causes the tapered slot 103 to admit a maximum volume of air in a minimum period of time to the interior of 70 and thus it will be perceived that, for quick sharp turning to the right, an effective disposition of parts is arranged and further, the application of engine vacuum and explosion pressure to opposite ends of 20 may be graduated without causing shock.

If it now be desired to straighten wheels 1 and 2 again, the turning of wheel 9 is immediately effective for working the control piston 93 to the end that the gaseous pressure is first equalized in both ends of 15 and thereafter the pressure on 23 is relieved and the vacuum applied thereto. This description will indicate the fact that, no matter if there is lost motion as described, or not, the differential pressure provided in the ends of 15 according to the position of 93 will move 8 and the linkage connected therewith to cause a binding of the gear-train in 11 (such gear-trains being generally irreversible), so that the lost motion in said gear-train will permit the easy movement of 9 for disengaging such binding easily when the movement of 9 has eliminated the lost motion. Thus a comparatively high gear ratio may be maintained in said gear-train in 11, reducing the angular movement required in 9 for a maximum turning of wheels 1 and 2.

It is distinctly understood, however, that the wheel 9 is always effective for turning wheels 1 and 2 apart from my invention and my invention, when inoperative due to the stoppage of engine 32, adds practically nothing to the torque normally required for 9 because there is only required additionally to overcome the friction of the piston heads 22 and 23.

Thus it will be seen that whereas, in the aforesaid co-pending application, the engine induction vacuum or compression pressure is used, I am now enabled to utilize a gaseous fluid pressure which is effective to operate a very small piston 20, because the work done by the explosion gases in an engine cylinder at about 120° of the explosion stroke is becoming increasingly lessened and at the same time there is no loss of volumetric efficiency, or compression pressure. It is apparent that explosion pressure could be taken from the spark plug orifice, but this is not desirable inasmuch as the above mentioned losses will ensue thereby.

It is apparent also that the cylinder 15 may be made double-acting, and also that a throttle 106 may be placed in the exhaust pipe 33 and gases under exhaust pressure drawn therefrom by suitable means, particularly for heating the reservoir 46, because the back pressure in the average exhaust pipe may be materially increased without great loss of power. The reservoir 46 is most conveniently placed as illustrated, as a pipe manifold, but it is obvious that a reservoir for gases under pressure may be located in other suitable parts of the system and also that the explosion pressure, as described, may be used alone without the engine induction vacuum through the same control 68 by disconnecting 67 from 34, connecting the same to pipe 57, directly joining pipes 70 and 69 to caps 16 and 17, respectively, and eliminating valves 61 and 62 and pipes 58, 59, 82 and 83, as described in the aforesaid co-pending application.

It will be noted that there is a groove 107 in the upper part of piston 40 above the uppermost piston ring 108 and, inasmuch as the top of piston 40 is tapered, the explosion pressure is operative in the groove 107 when the same is registered with passage 41 for ejecting excess gasoline, or lubricating oil, which may have collected in 107. This feature is especially valuable in starting an engine in cold weather when a heavy priming charge is induced from 35 through 34 to the interior of 2 because the engine being cold, a large portion of the gasoline will run down the cylinder walls and be collected in 107. Upon the first explosion stroke taking place, this fuel will be passed to 46 along with the heated gases and will thereby be immediately vaporized and returned again to the cylinder on the compression stroke as already described, whereby efficient running will be inaugurated immediately after starting.

Referring to another embodiment of my invention illustrating the use of explosion pressure taken from an engine cylinder at about 120° of the piston stroke and prior to the opening of the exhaust valve therefor, as illustrated in Figs. 14 to 20 inclusive and referring specifically to Figs. 14, 16, 17, 18, 19 and 20 it will be seen that the engine cylinder 2 has the usual intake manifold 34, exhaust pipe 33, exhaust valve 39, piston 40, crank shaft 42, carburetor 35, throttle 36 and port 41. The explosion, or exhaust, pressure in this instance is utilized to circulate the lubricating oil contained in the crank case 109, removing the dilution from the same by the heat of the gases circulating the oil, drawing the vaporized dilution into the engine intake manifold, cooling the refined lubricating oil, and returning the same to the engine with its viscosity restored for lubricating the same efficiently.

It will be seen that there is provided for the above purposes a pipe 110 connecting the passage 41 to an ejector 111 placed slightly below the level A—A of the lubricating oil in crank case 109. A check valve 112 and a thermostat 142 are placed in 110 between 41 and 111, and 110 leads into an enlarged chamber 113 terminating in an ejector nozzle 114. A screen 115 is placed in 113 and the end thereof is closed by a plug 116 for removing impurities therein.

A lift pipe 117 is arranged with its lower side in Venturi form to surround the nozzle 114 and a pipe 118 is arranged to bring the lubricating oil from 109 to 117, the return flow thereof being controlled by a check valve 119 closing an entry port 120.

The lift pipe 117 has its upper end inclosed in a chamber 121 and has a baffle 122 attached thereto. A second baffle 123 is suspended from the upper end of 121 to substantially parallel 122 at a predetermined distance. A screen 124 is arranged below 122, and the bottom of 121 is connected by a pipe 125 to a casing 126 surrounding the manifold 34 at its lower end. The pipe 125 contains a upwardly seated check valve 126a and a plug 127 is placed for drawing the impurities from the bottom of 121.

The pipe 128 connects the upper part of 121 to the air inlet of carburetor 35 on the atmosphere side of throttle 36. A pipe 129 connects the upper part of 126 to a chamber 130 attached to the cylinder 2, or forming a part thereof in the casting, and said pipe 129 discharges into 130. A pipe 131 leads from the upper part of 130 to the engine bearing 132 and a port 133 is arranged in the upper part of 130 to register with a groove 134 substantially surrounding the wrist pin 135, but said groove does not extend to register with port 41. The upper part of 40 is grooved as already described and beveled, in at least one portion, at 136.

A pipe 137 is fastened securely to the connecting rod 138 for passing oil from the wrist pin 135 to the bearing 139 on crank shaft 42. A plug 140 is provided for withdrawing impurities from 130.

The adaptation of my invention for the purpose of circulating and treating lubricating oil and removing, or maintaining the removal, of crank case dilution is that gases under explosion pressure are removed from cylinder 2 at about 120° of travel of piston 40 from upper dead center on the explosion stroke through passage 41 to pipe 110, whence the gases pass thermostat 142 and check valve 112 and by their velocity cause an ejector action in 111 whereby the lubricating oil therein is forced up the pipe 117 to be discharged into 121, flowing over the baffle 122. The application of the exhaust gases described not only lifts the lubricating oil through 117 but at the same time the volume of the said gases is so adjusted that the heat thereof is sufficient to bring a predetermined quantity of lubricating oil to a predetermined temperature to the end that when said oil is discharged against 123 and flows in a thin film over 122, a distillation of the dilution in the lubricating oil takes place, or in other words, any gasoline which should be mixed with the lubricating oil is vaporized and passes through pipe 128 to the intake of carburetor 35' The heated lubricating oil then passes through a screen 124 (which may be very fine mesh wire screen, felt, glass wool, layer of Fuller's earth etc.) and collects in the bottom of 121 until it flows over the top of pipe 125 to fill the same and also 126, all mechanical impurities such as sand, carbon, metal shavings, etc. being caught on the filter 124.

The container 126 will fill up with heated oil which imparts its heat to the incoming charge of gasoline and air through 34 whereby the vaporization of said gasoline is efficiently aided. The vaporization of this gasoline causes suitable reduction in temperature of the lubricating oil passing through 126 and the same is then conveyed at a low temperature and increased viscosity through 129 to 130 whence it reaches the level of the overflow port 133 and also passes through any number of pipes 131 to be distributed to any number of bearings 132.

Inasmuch as port 41 is designed to be uncovered by piston 40 at about 120° of travel, it will be noted that any gasoline or lubricating oil collected in 107 will be ejected through 41 and 110 as already described and thereby is prevented from reaching the crank case 109, and it might be also here noted that, if desired, the check valve 112 might be dispensed with and similar fittings 43, as already described in Fig. 9, could be installed to connect the pipe 110 with the port 41.

The system as described is effective for crank cases with splash lubrication, in which the lower end of 138 strikes the lubricating oil at the level A—A, but I prefer to inaugurate what is commonly known as the dry sump lubrication method wherein the level A—A is below the lowermost travel of 138.

In this method I arrange that when the piston 40 reaches the lowermost limit of travel, the groove 134 will register with the port 133 whereby lubricating oil will flow around 134 and enter wrist pin 135 (which is generally hollow). This permits an ample lubrication of the wrist pin bearings (which is generally a weak spot in lubrication systems) and the excess lubricating oil is conducted from the wrist pin through a pipe 137 to lubricate the bearings 139. It will thus be seen that inasmuch as the groove 134 is substantially filled with oil, there is sufficient lubrication for the walls of cylinder 2. Furthermore it will be noted that on the upstroke of piston 40, the port 133 will become uncovered allowing excess oil to flow out along the crank case walls to the bottom of the crank case.

In this system as described it will also be seen that the oil is circulated by the gases under explosion pressure, heated thereby and cooled by incoming gases prior to their explosion. With oil circulating in this manner a constant supply of cool viscous oil is provided to all working surfaces in the engine without splash lubrication. It will be noted also that the vacuum available through the pipe 128 is substantially ineffective for lifting the lubricating oil but is sufficient for removing the vaporized gasoline contained therein, because of the location of 128 with respect to 36.

An alternative construction of 111 is shown in Fig. 19 wherein the gases under pressure from 110 are passed into the oil through a number of holes 141 in order to give a large ratio of heating surface of gas to liquid fuel. In this manner, the numerous fine bubbles of inert gas not only aid the lifting effect desired in pipe 117 but also give up their heat more readily to the inclosing films of lubricating oil and this is especially desirable because of the low specific heat in general of the lubricating oil. The use of inert explosion gases for the purpose described is generally preferable to the use of heated air because of the oxidation effects of air on lubricating oils. Such oxidation of lubricating oils causes the formation of gums and resins which are very detrimental to the lubricating qualities of oils and reduce the life of a given quantity thereof very materially.

Referring now specifically to Fig. 15, I illustrate a modification of Fig. 14 in which the pipe 110 is direct connected to the exhaust manifold 33 and the pipe 128 is direct connected to the manifold 34 on the engine side of throttle 36. The arrangements already described are otherwise the same.

In this illustration it will be noted that, when the throttle 36 is substantially closed, the engine would be idling and consequently there would be a very low exhaust pressure in 33 but a high vacuum in 34, therefore the high vacuum applied to 121 is immediately effective upon starting for overcoming the inertia of the lubricating oil in 111 thereby permitting the passage of hot exhaust gases from 33 for the purpose of heating the upwardly flowing lubricating oil. It will be seen, of course, that when such high vacuum is initially applied to 121 that the check valve 126 will become seated thereby preventing return flow of lubricating oil from 130, but as soon as exhaust exhaust gases begin to flow through 114 and reach the interior of 121, said high vacuum is reduced, or broken, by the entry of said gases and thereafter the check valve 126 is unseated for permitting the flow of lubricating oil to 130.

In order to maintain a substantially continuous flow of lubricating oil in this manner, the entry of 128 to 121 is made a comparatively small orifice and in general the sizes of the pipes described in this system are such that the required result of circulating, heating, and cooling the lubricating oil is maintained.

Upon opening the throttle 36 a drop in vacuum applied through 128 takes place, but at the same time an increase of exhaust pressure in 33 is noted whereby a tendency to equalize the lifting pressures of the exhaust gases is apparent and such an increase of exhaust pressures in 33 may be maintained in limited degree by a suitable throttle 106 in 33 such as has been already described.

It is apparent that a combination of the systems described for Figs. 14 and 15 might be also made, wherein the pipe 128 in Fig. 14 is joined to 34 as shown in Fig. 15 and in such case, in place of 121, it might be desirable to use the well known Stewart Warner vacuum tank, or like apparatus.

While I prefer for any particular design of engine to so co-ordinate the sizes of the pipes and orifices employed that the required circulating, heating, and cooling effect is obtained, at the same time it is apparent that 121 might be jacketed with the exhaust gas from 33, or that the inlet of the exhaust gases through 110 might be suitably governed by a thermostatic connection from 121 in order to maintain a desired temperature in 121. Such a temperature should not exceed the cracking temperature of the lubricating oil being circulated, otherwise carbon will deposit excessively and such temperature in 121 may be about 550° F., but I do not limit myself to any special temperature because the same may be greatly varied with the degree of dilution occurring in a particular engine and also with the lubricating oil employed.

Another simple form of thermostatic control is provided by the insertion of thermostat 142 in pipe 110 and a detail of this is illustrated in Fig. 20 wherein the casing 142 is composed of a metal having a very low coefficient of expansion, such as invar, and is threaded at each end to be inserted in the pipe 110. An annular bushing 143 is provided having a true face on which is adapted to seat the head 144 of a tube 145 having a comparatively large coefficient of expansion, such being made for instance of brass. A small hole 146 is drilled centrally of 144, and a number of larger holes 147 are drilled around 145.

The operation of this thermostat (which is in the position illustrated when the engine is cold) is that when the gases under explosion pressure first pass through 110, a comparatively large annular space exists between 143 and 144 for the passage of said gases through 146, 147 and 145 for heating and lifting the lubricating oil in 111.

As the engine warms up the continued passage of hot gases through 145 causes a reduction of the annular area between 143 and 144 thereby reducing the volume of such gases, which are however at a higher temperature. Such reduction may be continued until 110 is completely closed except for the hole 146 which may be of an effective area for continuing the circulation of oil at normal running conditions.

Another suitable location for 142 would be in the pipe 128, as shown in Fig. 15. At starting, when high vacuum prevails, a large volume of hot gases would thus be drawn therethrough for heating a small quantity of lubricating oil to the desired temperature and thereafter the cooled gases and hot vapors passing through 142 will reduce the effective suction area due to the closing of 143.

Many other alternative thermostatic controls can be illustrated, but such are apparent to those skilled in the art and do not require exemplification herein.

In such cases, as described, as when the fitting 43 is placed in 110 close to 41, the reservoir 46 may be cut into 110 and the check valve 112 is eliminated, or a similar result is obtained for applying solely gases under explosion pressure by not using 43 and substituting 112 therefore between 46 and 41, but a reservoir 46 is unnecessary for the operation described for Fig. 14, the pipe 110 being continuous from 41 to 112.

It is apparent from the foregoing descriptions that the reservoir 46 may be used for charging only by removing 56 and substituting a plug, or may be used in the other combinations described including assistance in steering, or the circulating and heating of lubricating oil. As already stated, I prefer to abstract gases under explosion pressure from a cylinder at about 120° of the piston travel because the abstraction of gases at about this point causes no appreciable diminution of the work being done in the cylinder and also, with the apparatus described, there is no loss of combustible mixture under compression, or dilution of combustible mixture on the suction stroke.

I claim:—

1. In combination, a vehicle, an internal combustion engine for propelling said vehicle, a reservoir, means for storing the exhaust gases of said engine under pressure developed in said cylinder prior to the opening of the exhaust valve thereof, means for steering said vehicle, and mechanism for utilizing the pressure of said gases for operating said steering means.

2. In a vehicle having an internal combustion engine and front wheels controlled by steering mechanism, said engine being provided with a reciprocating piston and an exhaust valve, the combination of means for turning the front wheels comprising said steering mechanism and a movable member connected to said mechanism and subjected to gases under pressure generated by said engine for operating said member, and means for supplying the exhaust gases from the cylinders of said engine to said movable member just prior to the opening of the exhaust valves of said cylinders.

3. In a vehicle having an internal combustion engine and dirigible wheels, mechanism for steering said wheels, a steering wheel for manually operating said mechanism, means including a movable member operated by the combined engine suction and explosion pressure for operating said mechanism, and means operated by the turning of said wheel for controlling the operation of said member, said last-named means comprising a valve, a casing therefor contiguous to said steering wheel, and means frictionally engaging said wheel and casing to cause said casing to be moved by said wheel.

4. In a motor vehicle provided with an internal combustion engine for propelling said vehicle, said engine having exhaust and intake passages, said vehicle having dirigible front wheels and conventional steering mechanism including a steering wheel having a lost motion connection for steering said front wheels, piston means, valve mechanism for placing said piston means in communication with said intake passage and concurrently with said exhaust passage for moving said piston means in one direction for steering said vehicle to the right, valve mechanism for reversing the communications for steering said vehicle toward the left, and means operated solely by the turning of said steering wheel through said lost motion connection for controlling the operation of said valve mechanism.

5. In combination, a vehicle having dirigible wheels, an engine for propelling said vehicle, said engine having exhaust and intake passages, mechanism for steering said dirigible wheels, piston means connected to said mechanism, means including valve mechanism for subjecting said piston means to the action of the suction in said intake passage, and concurrently subjecting the same to the pressure in said exhaust passage, for moving said piston means in one direction for steering said vehicle toward the right, means for reversing the application of said suction and exhaust pressure to said piston means for steering said vehicle to the left, and manually operable means only for controlling the operation of said valve mechanism.

Signed at Wilmington, in the county of Los Angeles, and State of California, this 26th day of July, A. D. 1924.

CHARLES LAWRENCE STOKES.